United States Patent [19]

Nishizawa

[11] Patent Number: 5,696,754
[45] Date of Patent: Dec. 9, 1997

[54] OPTICAL DISK HAVING A HIGH-DENSITY RECORDING LAYER AND A LOW DENSITY RECORDING LAYER

[75] Inventor: Akira Nishizawa, Kanagawa-ken, Japan

[73] Assignee: Victor Company of Japan, Ltd., Yokohama, Japan

[21] Appl. No.: 655,414

[22] Filed: May 30, 1996

[30] Foreign Application Priority Data

May 31, 1995 [JP] Japan .................................. 7-158640

[51] Int. Cl.$^6$ ........................................ G11B 7/24
[52] U.S. Cl. .............. 369/275.1; 369/283; 428/694 ML
[58] Field of Search ................. 369/275.1, 275.2, 369/275.3, 13, 283, 284, 94, 110, 109, 112, 275.4, 286, 44.38; 360/114, 59; 428/694 ML, 694 SC

[56] References Cited

U.S. PATENT DOCUMENTS

| | | | |
|---|---|---|---|
| 4,441,179 | 4/1984 | Slaten ................... | 369/275.1 |
| 4,450,553 | 5/1984 | Holster et al. ........... | 369/275.1 |
| 4,503,531 | 3/1985 | Kato ..................... | 369/275.1 |
| 4,984,231 | 1/1991 | Yasuoka et al. .......... | 369/275.1 |
| 5,381,401 | 1/1995 | Best et al. .............. | 369/275.1 |
| 5,485,452 | 1/1996 | Maeda ................... | 369/284 |
| 5,540,966 | 7/1996 | Hintz .................... | 428/64.1 |

FOREIGN PATENT DOCUMENTS

| | | |
|---|---|---|
| 0 520 619 A1 | 12/1992 | European Pat. Off. . |
| 0 720 159 A2 | 3/1996 | European Pat. Off. . |
| 0 737 966 A1 | 10/1996 | European Pat. Off. . |
| 2-223030 | 5/1990 | Japan . |

*Primary Examiner*—Ali Neyzari
*Attorney, Agent, or Firm*—Michael N. Meller

[57] ABSTRACT

The present invention relates to an optical disk having a high density information recording layer for recording information at high density and an information recording layer which stores information at a density lower than the high density information recording layer. The optical disk also has a light incidence surface which is formed on the opposite side from the second information recording layer, where, the thickness of the disk from the light incidence surface to the second information recording layer is made the same as the thickness of the disk.

5 Claims, 5 Drawing Sheets

FIRST PLAYBACK LASER BEAM

SECOND PLAYBACK LASER BEAM

OPTICAL DISK HAVING A HIGH-DENSITY RECORDING LAYER AND A LOW DENSITY RECORDING LAYER

BACKGROUND OF THE INVENTION

1. Field of the Invention

The present invention relates to a high-density optical disk with a bonded structure in which two substrates, each of which form an information signal layer, are bonded together.

2. Description of the Prior Art

Optical disks such as compact disks (hereafter referred to as "CDs"), which have existed for some time, have come into wide usage due to the amount of information they are able to store as well as their ease of handling. These CDs are formed by one substrate and, therefore, have a so-called single substrate structure.

Specifically, the thickness of the CD is approximately 1.2 mm (±0.1 mm), and the distance from the light incidence surface, into which the playback laser beam enters to the information recording layer, is 1.1 to 1.3 mm.

Information which is in a format which is compatible with CDs is recorded onto this information recording layer, and this information is formed at a minimum pit length of 0.9 micron meter (μm) and a track pitch of 1.6 micron meter (μm) or less.

Figure 1:
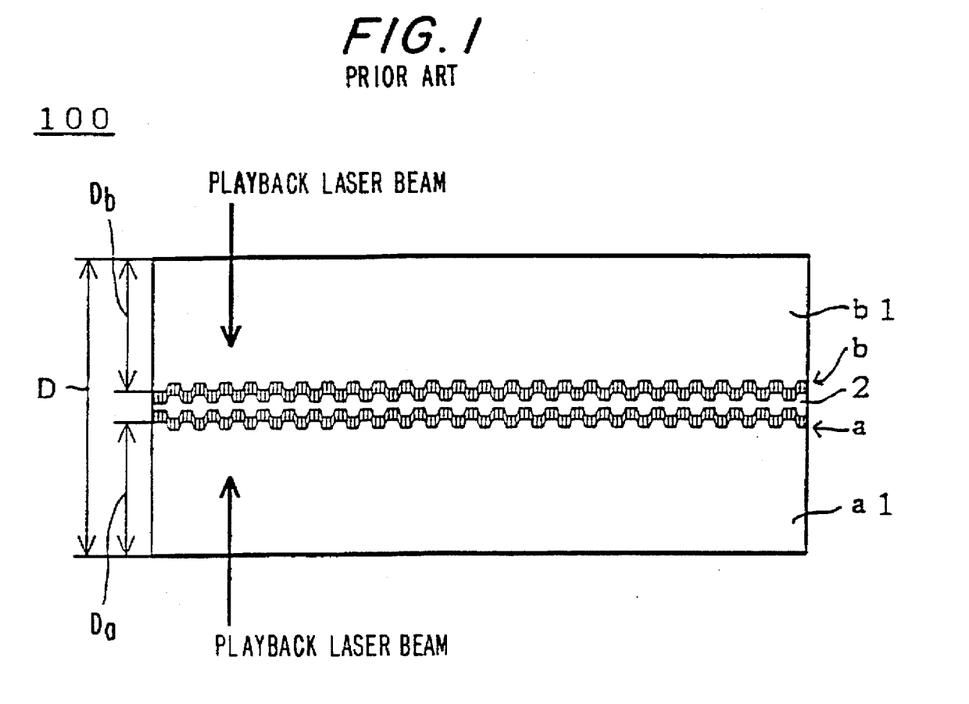
FIG. 1 is a diagram which shows an example of the conventional optical disk structure.

On the other hand, as shown in FIG. 1, there is a type of optical disk 100 with a bonded structure which forms two information recording layers by using a transparent bonding agent to bond a substrate a1, which forms the first information recording layer a, and a substrate b1, which forms the second information recording layer b, so that the information recording layers, a and b, are facing each other.

As shown in FIG. 1, this type of optical disk 100 is such that a playback laser beam is irradiated from both sides of the disk to read the information.

Compared to the single substrate structure, since this bonded structure has little disk warpage, and it can store twice as much information, it is increasingly used to enlarge the storage capacity of high-density optical disks.

High-density optical disks are optical disks which record information at a higher density than CDs by recording smaller recording pits at a more compressed track pitch.

With a high-density optical disk with the aforementioned bonded structure (hereafter this may be simply described as "high-density optical disk"), it is conceivable that the various types of optical aberrations caused by the thickness of the substrate can be reduced by making the bonded substrates thinner than that of the CD. For example, it is conceivable that a structure can be made in which the thicknesses, Da and Db, of the substrates, a1 and b1 shown in FIG. 1, are set to 0.6 mm, and by bonding these substrates together, a1 and b1, the thickness D of the disk is set to 1.2 mm.

Because the high-density optical disk 100 with the aforementioned bonded structure is made under the assumption that it will be played back on a player (hereafter described as a "high-density playback player") which is specifically for this high-density optical disk, it cannot be played back on a CD player. This is because the information recording layer is formed at the middle of the direction of the thickness of the disk. That is, because this high-density optical disk has a structure which has a first information recording layer a and a second information recording layer b at the middle of the direction of the thickness of the disk with the thicknesses, Da and Db, of substrates a1 and b1 as half of the thickness of the CD, the optical length of the optical pickup differs from that of the CD, and, for the time being, playback on a CD player is not possible even if CD information signals are recorded on one of the information recording layers.

In this way, the conventional high-density optical disk with a bonded structure has a disadvantage in that it cannot be played back on existing CD players.

On the other hand, a known type of disk with a layered structure which is different from the aforementioned high-density disk 100 with a bonded structure is a high-density disk which, by means of a transparent layer, stacks multiple reflective layers (information recording layers) in which the reflected light ranges mutually differ (for example, the "Optical Information Recording Medium and Its Method of Manufacture" described in Laid-Open Patent Publication No. HEI 2-223030).

However, there is no description which relates to also making it possible to play back this high-density disk with a layered structure on an existing disk player by making it compatible with existing disks; only an optical disk which improves the recording density through a layered structure is presented.

That is, an area that is not touched upon at all is that, as a result of the high-density disk being such that (1) the thickness of the disk is made the same as the thickness of existing CD disks, (2) the diameter of the disk is made the same as the diameter of existing CD disks, and (3), CD information signals are recorded on one of the multiple reflective layers (information recording layers), and the distance from the light incidence surface of the high-density disk to the information recording layer where the CD information signals are recorded is made the same as an existing CD's distance from the light incidence surface to the information recording layer; from the standpoint of the outer appearance and playback characteristics of the disk, even in the case where this high-density disk is loaded into an existing CD player, it is recognized by the CD player just as if an existing CD were loaded, and it is therefore possible to play back this high-density disk in an existing CD player.

BRIEF SUMMARY OF THE INVENTION

1. Object of the Invention

The purpose of this invention is to provide a high-density optical disk which can be played back on an existing CD player by means of said disk being made compatible with existing CDs.

2. Brief Summary

The aspect of this invention provides an optical disk in which information which can be optically read is stored, comprising:

a first information recording layer formed in the vicinity of the middle of the thickness direction of the disk;

a second information recording layer, which is formed in the vicinity of the surface of the aforementioned optical disk and which stores information at a lower density than the aforementioned first information recording layer; and a light incidence surface into which the first and second playback laser beams, which are for reading the information on the aforementioned first and second information recording layers, enter and which is formed at the side opposite the aforementioned surface;

wherein, the thickness of the disk from the aforementioned light incidence surface to the aforementioned second information recording layer is made the same as the thickness of the disk from the light incidence surface, which is on the optical disk with a single-substrate structure equipped with only a single information recording layer, to the information recording layer, wherein, the diameter of the disk is made the same as the diameter of the aforementioned optical disk with a single-substrate structure.

In order to make it possible to play back the high-density optical disks with a bonded structure, in which the thickness of the substrate has been made thinner than that of a CD, on a CD player as well, it is desirable that a first information recording layer with a high recording density be positioned at a location which corresponds to the optical length of the optical pickup of the high-density playback player and that a second information recording layer for CDs be positioned at a location which corresponds to the optical length of the optical pickup of a CD player.

That is, the first information recording layer is formed in the vicinity of the middle of the direction of the thickness of the disk, and the second information recording layer is formed in the vicinity of the surface of the side opposite the playback incident light surface.

Also, the reflective layer positioned on the first information recording layer is formed using silicon (Si), for example, so that a laser beam in the CD playback wavelength range will pass through it.

The reflective layer positioned on the second information recording layer uses a material which has high light reflectance regardless of the wavelength range, such as aluminum.

Through this, it is possible to adequately ensure the amount of reflected light from the second information recording layer. By doing this, a single disk can be played back by both a high-density playback player and a low-density playback player (CD player).

When, in this way, a first information recording layer with a high recording density and a second information recording layer with a low recording density which corresponds to existing optical disks, such as CDs, are placed inside a single disk, for example, software which can be played back at high resolution can be recorded onto the first information recording layer, which has a high recording density, and the same software can be recorded at low resolution onto the second information recording layer, which has a low recording density.

If this is done, playback is possible even on a low-density playback player, so even users who do not have a high-density playback player can purchase this optical disk. Also, because the same software can be played back at high resolution in the case where a high-density playback player is purchased, a single optical disk may be used for a long period of time.

The above and other related objects and features of the invention will be apparent from a reading of the following description of the disclosure found in the accompanying drawings and the novelty thereof pointed out in the appended claims.

DETAILED DESCRIPTION OF THE INVENTION

<Basic Configuration>

Figure 2:
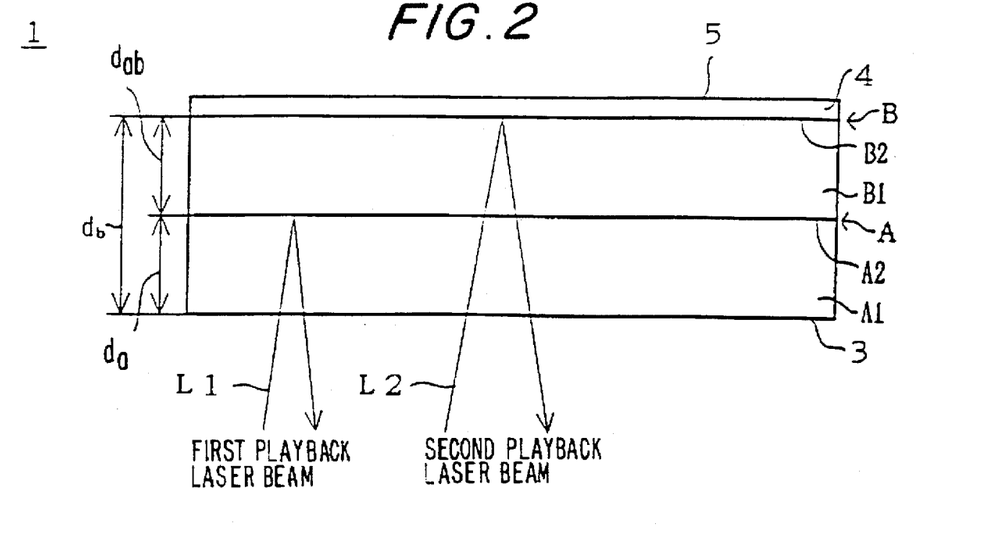
FIG. 2 is a diagram for explaining the basic configuration of the present invention.

Firstly, FIG. 2 will be used to explain the basic configuration of the optical disk of the present invention.

FIG. 2 is a diagram for explaining the basic configuration of the present invention. FIG. 2 shows an outline of the optical disk structure in order to explain the basic configuration of the present invention.

As shown in FIG. 2, the optical disk i of the present invention has two information recording layers in the direction of the thickness of the disk, where the first information recording layer A is positioned in the vicinity of the middle of the thickness direction of the optical disk 1, and the second information recording layer B is positioned in the vicinity of the surface of the optical disk 1.

The surface opposite the surface where the aforementioned second information recording layer B is positioned becomes the light incidence surface 3 entered by the first playback laser beam L1, which is for playing back the information recorded in the first information recording layer A, and the second playback laser beam L2, which is for playing back the information stored in the second information recording layer B.

In FIG. 2, 4 is a protective film, and 5 is the label surface.

Also, the distance (disk thickness) db from the light incidence surface 3 to the second information recording layer B is set to be the same as the 1.2 mm (±0.1 mm) thickness of the CD disk.

Pits which are smaller than the pits formed on a CD are formed on the aforementioned first information recording layer A at a track pitch which is narrower than that of a CD. In addition, information which can be played back by a CD player is recorded on the aforementioned second information recording layer B, so pits which are the same size as those of a CD are formed at the same track pitch as a CD.

The aforementioned first playback laser beam L1 is a laser beam which has a shorter wavelength range than the second playback laser beam L2, and its convergence spot diameter is smaller than that of the second playback laser beam L1. Also, the second playback laser beam is a laser beam in the CD playback wavelength range (780±10 nm).

The thickness of the optical disk I is set at approximately 1.2 mm (±0.1 mm) to be compatible with a CD, and the distance db from the light incidence surface 3 to the second information recording layer B becomes 1.1 to 1.3 mm. The distance da from the light incidence surface 3 to the first information recording layer A is 0.6 mm, and the distance dab between the first information recording layer A and the second information recording layer B is such that they are separated by approximately 0.5 to 0.7 mm. This is because the first information recording layer A is positioned at the location of the optical length of the optical pickup of the high-density playback player, and the second information recording layer B is positioned at the location of the optical length of the optical pickup of the CD player.

The first reflective layer A2 is positioned on the aforementioned first information recording layer A, and the second reflective layer B2 is positioned on the aforementioned second information recording layer B.

Figure 3:
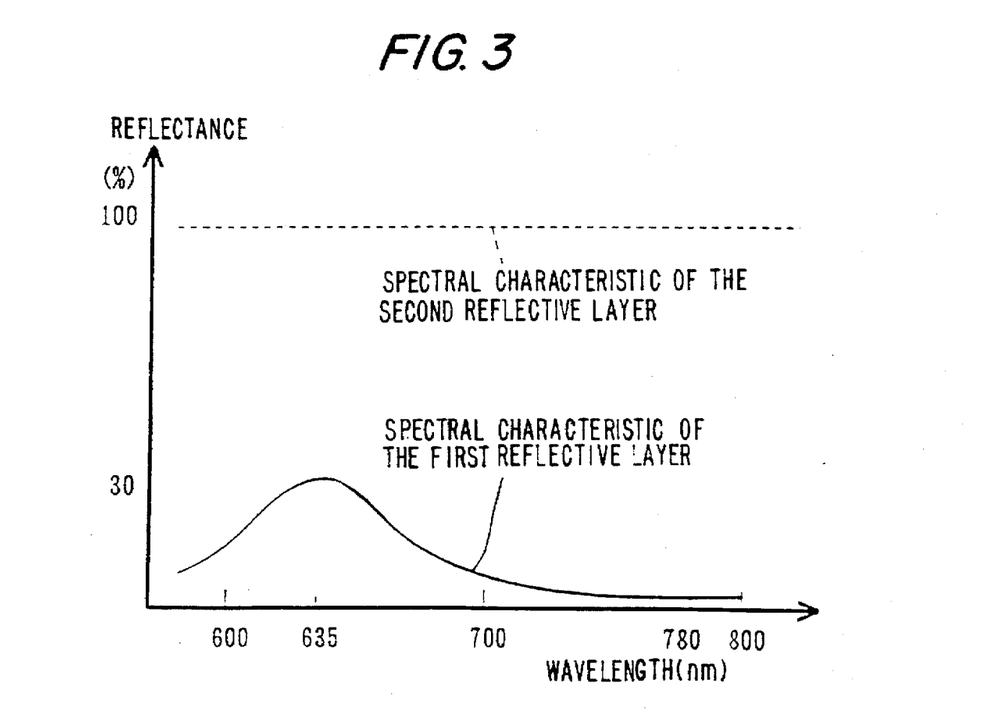
FIG. 3 is a diagram which shows the spectral characteristic of the optical disk of FIG. 2.

The aforementioned first reflective layer A2 is constructed in such a way that reflects the first playback laser beam L1 and is nearly permeable to the second playback laser beam L2; for example, it has a spectral characteristic such as that shown in FIG. 3.

In FIG. 3, the case shown is one in which the playback wavelength of the aforementioned first playback laser beam L1 is set to 635 nm, the second playback laser beam L2 is set to 780 nm, and the first reflective layer A2 is formed of silicon (Si) with a film thickness of approximately 60 nm.

As shown in FIG. 3, the first reflective layer A2 is constructed so that it has a reflectance of approximately 30 percent with respect to the first playback laser beam L1 and has a reflectance of approximately 5 percent with respect to the second playback laser beam L2. Also, as shown in FIG. 3, the second reflective layer B2 is constructed of a material that is highly reflective regardless of the playback wavelength, such as gold or aluminum.

Therefore, the reflectance of the optical disk 1 with respect to the first playback laser beam L1 is approximately 30 percent, and the reflectance of the optical disk 1 with respect to the second playback laser beam L2 is approximately 70 percent.

<Optical Disk>

Next, an embodiment of the optical disk of the present invention will be explained.

Figure 4A:
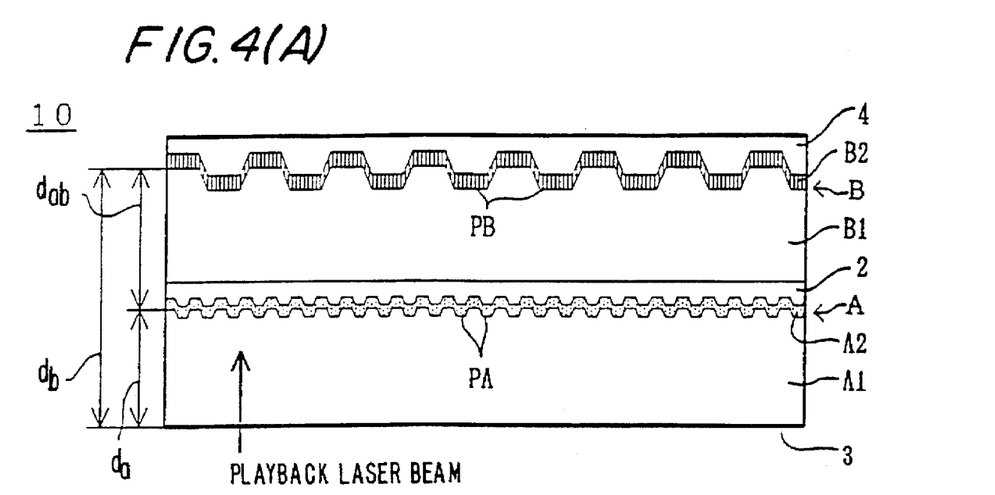
FIGS. 4(A)–4(B) are a diagram which shows parts of the cross-sectional structures of embodiments of the optical disk of the present invention.
Figure 4B:
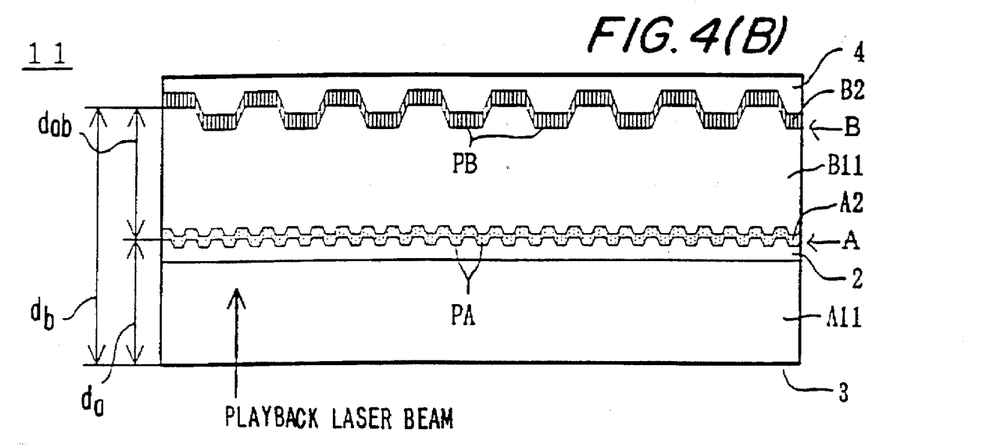

FIG. 4 is a diagram which shows parts of the cross-sectional structures of embodiments of the optical disk of the present invention, where FIG. 4(A) shows the first embodiment, and FIG. 4(B) shows the second embodiment.

FIG. 4 shows a cross-sectional diagram in the direction of the radius of the optical disk. The same codes are assigned to the same sections as in the aforementioned optical disk 1, so an explanation of these has been omitted.

<The First Embodiment of the Optical Disk>

As shown in FIG. 4(A), optical disk 10, which is the first embodiment of the optical disk of the present invention, is such that the first information recording layer A is formed on one side (the bonding layer 2 side) of the first substrate A1 while the second information recording layer B is formed on one side (the protective film 4 side) of the second substrate B1, and it is formed by one side of (the bonding layer 2 side) of the first substrate A1 and one side (the light incidence surface 3 side) of the second substrate B1 being bonded together.

The aforementioned first substrate A1 and second substrate B1 are constructed of materials used in conventional optical disks, such as glass and light-permeable resins, for example, polycarbonate, polymethacrylate ester resin and epoxy resin.

The structure is such that the thickness of the first substrate A1 is 0.6 mm, and the thickness of the second substrate B1 is 0.55 mm. The film thickness of the bonding layer 2 is 0.05 mm, and the thickness of optical disk 10 (the distance db from the light incidence surface 3 to the second information recording layer B) is approximately 1.2 mm. The diameter of optical disk 10 is 120 mm.

In this way, in order to achieve compatibility with CDs, the aforementioned optical disk 10 is configured so that it has the same thickness (the distance from the light incidence surface to the information recording layer) and diameter as a CD.

Also, the surface opposite the surface (the label surface 5 side) on which the aforementioned second information recording layer B is positioned is the aforementioned light incidence surface 3, and this is such that it is permeated by the aforementioned first playback laser beam L1 and the aforementioned second playback laser beam L2.

In addition, the first and second information recording layers, A and B, are such that information is recorded onto them by means of pits, PA and PB, which form concavo-convex shapes which correspond to the respective playback wavelengths. Pits PA and PB are each pit arrays, and they are formed concentrically or spirally.

In the aforementioned way, information is recorded at high density on the first information recording layer A, so pits PA are formed smaller than the pits recorded on a CD, and their track pitch is also formed narrower than that of a CD; for example, they are formed at a minimum pit length of 0.41 micron meter (μm) and a track pitch of 0.73 μm.

On the other hand, in the aforementioned way, information which has a signal format which corresponds to a CD is recorded in the second information recording layer B, so pits PB are the same size as those of a CD, and they are formed at the same track pitch as a CD; for example, they are formed at a minimum pit length of 0.9 μm and a track pitch of 1.6 μm.

Also, the aforementioned bonding layer 2 is constructed using a transparent ultraviolet-ray-hardened resin whose main constituent is, for example, acrylic ester or methacrylic ester. These resins have a fast rate of polymerization, and they harden in a short time, so they are appropriate for the applications of the present invention.

A protective film 4, which is made of an ultraviolet-ray-hardened resin, for example, is formed on the aforementioned second reflecting layer B2, and there is a label surface 5, on which a description of the recorded information is displayed, on top of this protective film 4.

<The Second Embodiment of the Optical Disk>

On the other hand, as shown in FIG. 4(B), optical disk 11, which is the second embodiment of the present invention, is such that the first and second information recording layers, A and B, are respectively formed on the two surfaces of one substrate (the second substrate B11), and the light incidence surface of the second substrate B11 and the first substrate A11, on which no information recording layer is formed, are bonded together.

Specifically, the aforementioned first information recording layer A is formed on the bottom surface of the second substrate B11, and the aforementioned second information recording layer B is formed on the top surface. The structure is such that the surface where the first information recording layer A of this second substrate B11 is formed is bonded with a substrate (the first substrate A11), both of which surfaces are flat, by means of the aforementioned bonding layer 2.

This optical disk 11 has the same diameter, 120 mm, as the aforementioned optical disk 10, the first substrate A11 is 0.55 mm thick, the second substrate B11 is 0.6 mm thick, the film thickness of the bonding layer 2 is 0.05 mm, and the thickness of optical disk 11 overall is 1.2 mm. Therefore, the aforementioned optical disk 11 also has the same thickness and diameter as a CD.

By configuring the optical disk in the aforementioned way, effects which have heretofore not been conceived of can be exhibited.

Specifically, looking at the aforementioned optical disks 10 and 11 from the standpoint of CDs, since the disk substrate has a substrate precision which permits high-density signals to be played back, the signal quality resulting from substrate precision is dramatically improved compared with a CD, and reliability is far superior.

For example, since the disk warp angle is half or less that of a CD, there is the effect of a drop in the signal error rate. Substrate precision is improved with respect to disparity in disk thickness, birefringence and eccentricity, and this has the effect of reducing the signal error rate.

In the aforementioned optical disks 10 and 11, an example which used specific values for the disk diameter and the respective thicknesses of the first substrate A1, the second substrate B1, and the bonding layer 2 was given, but the present invention is not limited to these.

<Optical Disk Playback>

Next, the case where optical disks 10 and 11, which are configured in the aforementioned way, are loaded into the respective playback devices for high-density playback and low-density playback (for CD playback) and played back will be explained.

In the case where optical disks 10 and 11 are loaded into a high-density playback player, the aforementioned first playback laser beam L1 is irradiated from the high-density playback player. In the aforementioned way, the first reflective layer A2 has high reflectance with respect to the first playback laser beam L1. For this reason, the focus of the optical pickup matches the first information recording layer A, and the information of the first information recording layer A is played back.

When the aforementioned optical disks 10 and 11 are loaded into an existing low-density playback player, such as a CD player, the aforementioned second playback laser beam L2 is irradiated from this type of player. The aforementioned first reflective layer A2 has low reflectance with respect to the second playback laser beam. Here, the second information recording layer B is positioned at a location which matches the optical length of the optical pickup of the CD player. Moreover, the first reflective layer A2 is configured so that the reflectance of optical disks 10 and 11 with respect to the irradiation of the second playback laser beam L2 becomes 70 percent or more. Therefore, the focus of the optical pickup matches on the second information recording layer B, and the second information recording layer B is played back in the low-density playback player (CD player).

<Optical Disk Manufacturing Method>

Next, the methods of manufacturing the aforementioned optical disks 10 and 11 will be explained.

The aforementioned optical disks 10 and 11 each have a structural in which two substrates are bonded together, but they differ with respect to whether the first information recording layer A is formed on the substrate side on which the second information recording layer A is formed.

<Manufacturing Method For the First Embodiment of the Optical Disk>

First, the method of manufacturing the aforementioned optical disk 10 will be explained.

Figure 5A:
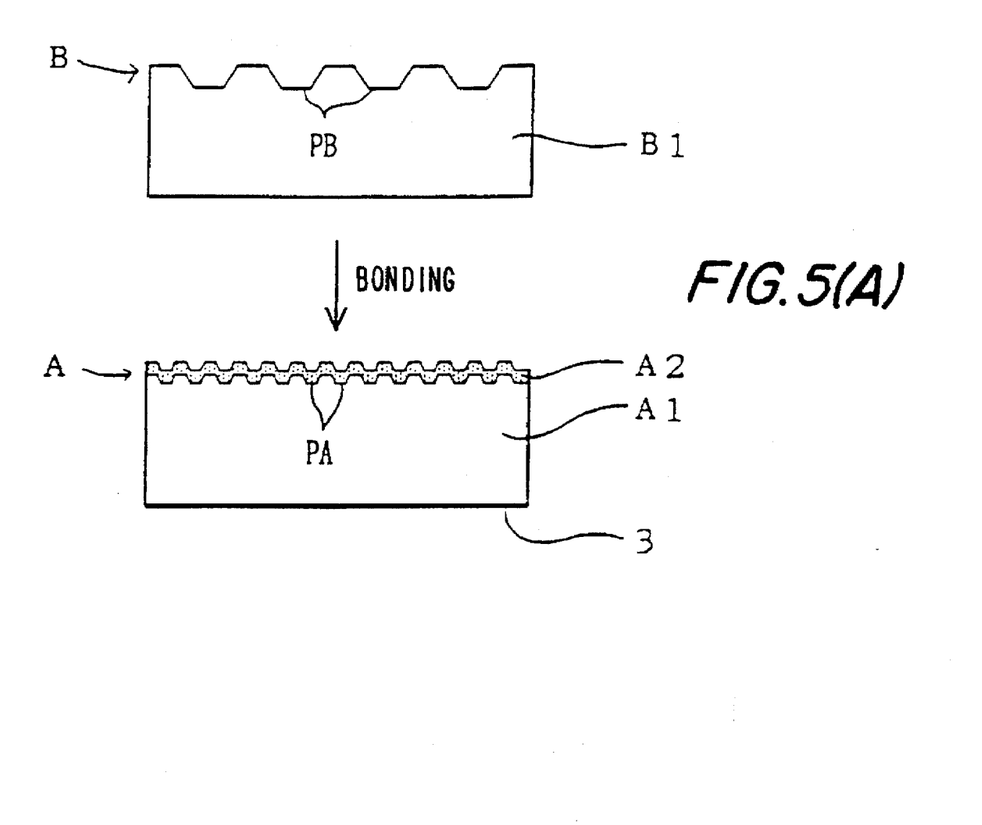
FIGS. 5(A)–5(B) are a diagram for explaining the method of manufacturing the optical disk of the first embodiment of the present invention.
Figure 5B:
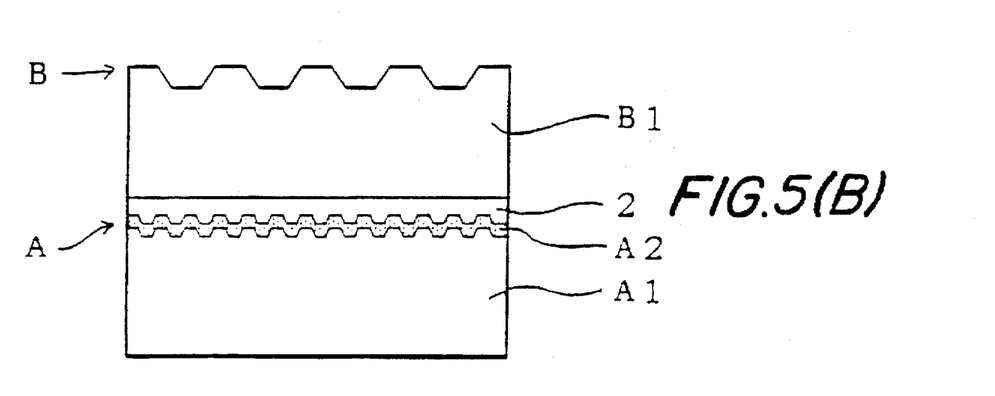

FIG. 5 is a diagram for explaining the method of manufacturing the first embodiment of the optical disk of the present invention.

As shown in FIG. 5(A), the aforementioned pits PA of the first information recording layer A are formed on one side of the first substrate A1, and the aforementioned pits PB of the second information recording layer B are formed on one side of the second substrate B1. The first substrate A1 and the second substrate B1, on which these pits, PA and PB, are formed, are manufactured by an injection molding method which uses a stamper in the same way as CDs or by the 2P method.

The thickness of the bonding is estimated, and the thickness of the first substrate A1 or the second substrate B1 is set to 0.55 mm for example, and the optical length of the optical disk after the first substrate A1 and the second substrate B2 are bonded together is set to 1.2 mm.

Also, the first reflective layer A2 is formed on the first information recording layer A, which becomes the bonded surface. This first reflective layer A2 is formed by a method of sputtering or vapor-depositing silicon (Si). When the first reflective layer A2 is constructed of silicon, the signal type during playback changes when the membrane thickness changes, so membrane thickness control is adequately performed.

Before the first substrate A1 and the second substrate B1 are bonded together, the second reflective layer B2 may be formed in advance on the second substrate B1 signal surface.

In addition, when the thicknesses of the silicon and aluminum are each set to 50 nm, it is possible to obtain a reflectance which satisfies the standards for both high-density playback and low-density playback.

Next, an ultraviolet-ray-hardened resin, which becomes the bonding layer 2, is dripped onto the surface of the first information recording layer A of the first substrate A1, then this is bonded with the flat surface of the second substrate B1.

Next, the resin is expanded with a spin coater, and after that, the resin is hardened by irradiating ultraviolet rays from the lower side of the first substrate A1 or from the upper side of the second substrate B1 (ultraviolet rays are irradiated from only the lower side of the first substrate A1 in the case where the second reflective layer B2 is formed in advance).

When the resin is hardened in this way, as shown in FIG. 5(B), the first substrate A1 and the second substrate B1 are bonded together. After this, optical disk 10 is manufactured by forming the second reflective layer B2 from aluminum on the upper surface of the second substrate B1, forming a protective membrane 4 when a material such as an ultraviolet-ray-hardened resin is spin-coated on top of this, and performing label printing on the surface of this protective film 4.

<Manufacturing Method For the Second Embodiment of the Optical Disk>

Figure 6A:
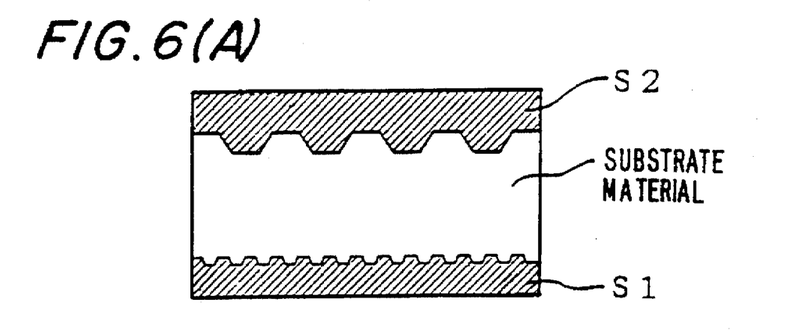
FIGS. 6(A)–6(C) are a diagram for explaining the method of manufacturing the optical disk of the second embodiment of the present invention.
Figure 6B:
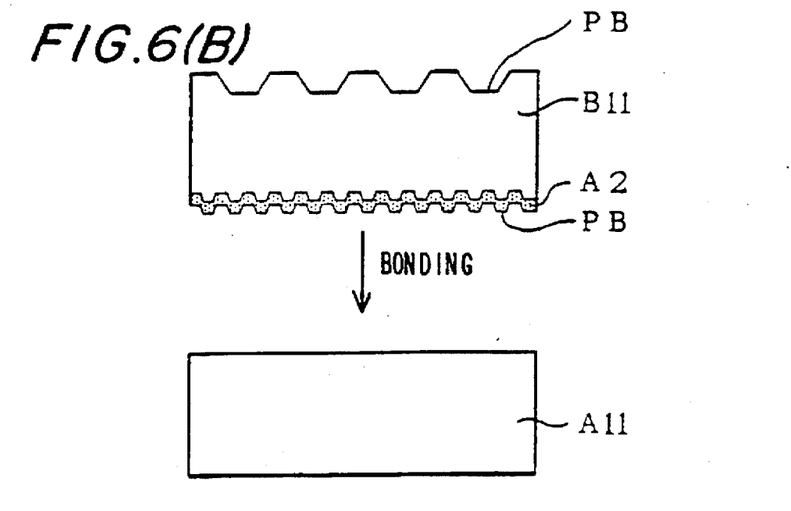
Figure 6C:
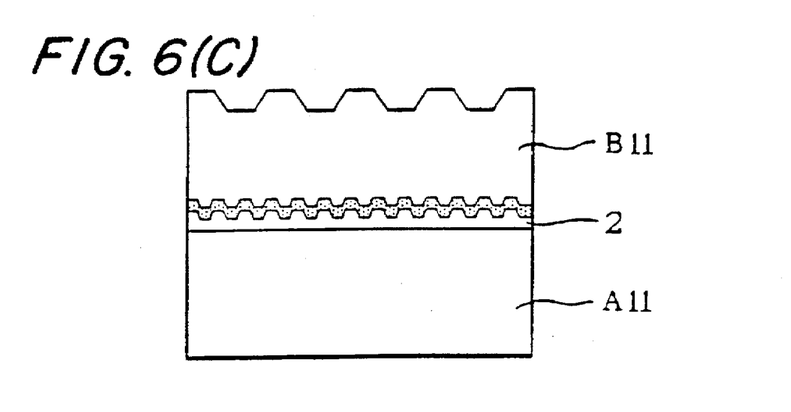

Next, FIG. 6 will be used to explain the method of manufacturing optical disk 11.

FIG. 6 is a diagram for explaining the method of manufacturing the second embodiment of the optical disk of the present invention.

The aforementioned optical disk 11 is such that the first information recording layer A is formed on the lower surface of the second substrate B1, and the second information recording layer B is formed on the upper surface.

As shown in FIG. 6(A), this second substrate B11 is molded so that a stamper S1, which is for forming the first information recording layer A, and a stamper S2, for forming the second information recording layer B, flank the aforementioned substrate material.

As shown in FIG. 5(A), the aforementioned optical disk 10 is such that pits PB are formed on the upper surface of the second substrate B1 as pits PA are formed on the upper surface of the first substrate A1, which is a separate body, and, as shown in FIG. 5(B), by bonding the lower surface of the second substrate B1 with the upper surface of the first substrate A1, a single disk in which the first substrate A1 and the second substrate B1 are bonded together can be obtained.

As a result, since both pits PA and PB are formed on the upper surfaces of substrates A1 and B1, pits PA and pits PB can be played back from the same direction.

As shown in FIG. 6(A), in contrast with this, the aforementioned optical disk 11 has pits PB formed on the upper surface of the base material (the second substrate B11), which is a single unit, while pits PA are formed on its lower surface; and, as shown in FIG. 6(B), by bonding the upper surface of the first substrate A11 onto the lower surface of this second substrate B11, a single disk in which the first substrate A11 and the second substrate B11 are bonded together can be obtained.

However, in order to make playback of both pits PA and PB from the same direction possible, it is necessary to form pits PB (that is, the same pattern as the pattern of pits PB on optical disk 10) on the upper surface of the second substrate B11 while forming the inverted pits PA (that is, the same pattern as the pattern of pits PA on optical disk 10) on the lower surface of the second substrate B11.

Therefore, as shown in FIG. 6(A), when a stamper for CD substrate molding is used as the stamper S2 (that is, in the same case as when the pits PB pattern of optical disk 10 was molded) for example, it is necessary to use a stamper which has a pattern which is the reverse of that of the stamper which molds pits PA of optical disk 10 as stamper S1.

The first reflective layer A2 is formed on the surface of the first information recording layer A of the second substrate B11, which has been configured in the aforementioned way, and this first information recording layer A side is bonded together (see FIG. 6(B)) with the first substrate A11, both of whose surfaces are flat. A thickness of 0.5 mm to 0.6 mm is used for this first substrate A11.

An ultraviolet-ray-hardened resin is used in this bonding in the same way as with the aforementioned optical disk 10, and this ultraviolet-ray-hardened resin becomes the bonding layer 2. Then, after the ultraviolet-ray-hardened resin is hardened (see FIG. 6(C)), manufacturing is performed in the same way as with the aforementioned optical disk 10.

Since it is not only possible to mold two substrate layers at once but to also control disk eccentricity within a single mold, the manufacturing method for optical disk 11 is one which is desirable in terms of mass production.

In the aforementioned embodiments, the explanation focused on dedicated playback optical disks, but the present invention can, of course, also be appropriately applied to types which can be added to or rewritten.

What is claimed is:

1. An optical disk in which information which can be optically read is stored, comprising:

a first information recording layer positioned at a first location which corresponds to the optical length of the optical pickup of a first information playback player, with the first information recording layer formed in the vicinity of the middle of the thickness direction of the disk for storing high density information;

a second information recording layer positioned at a second location which corresponds to the optical length of the optical pickup of a second information playback player, with the second information recording layer formed in the vicinity of one surface of said optical disk for storing information at a lower density than said first information recording layer; and a light incidence surface into which first and second playback laser beams from said first and second information playback player are irradiated for reading the information on said first and second information recording layers respectively, with said light incidence surface being formed at a side of said optical disk opposite said one surface;

wherein, the thickness of the disk extending from said light incidence surface to said second information recording layer is substantially equal to the thickness of the optical disk.

2. The optical disk according to claim 1, wherein the thickness of the disk from the aforementioned light incidence surface to the aforementioned second information recording layer is set to 1.1 to 1.3 mm, and the thickness of the aforementioned first information recording layer and second information recording layer is set to 0.5 mm or more.

3. The optical disk according to claim 1, wherein at least two light-permeable substrates are bonded together.

4. The optical disk according to claim 1, further comprising:

a first substrate, which forms the aforementioned first information recording layer; and a second substrate, which forms the aforementioned second information recording layer;

wherein the side where the first information recording layer of the aforementioned first substrate is formed and the side where the second information recording layer of the aforementioned second substrate is not formed are bonded together.

5. The optical disk of claim 1, further comprising:

a first substrate where the aforementioned first information recording layer and the aforementioned second information recording layer are not formed; and a second substrate, which forms the aforementioned first information recording layer on one side and forms the aforementioned second information recording layer on the other side;

wherein the side where the first recording layer of the aforementioned second substrate is formed and the aforementioned first substrate are bonded together.

* * * * *